United States Patent [19]

Trueman et al.

[11] 3,892,338

[45] July 1, 1975

[54] MEANS FOR DISPENSING METERED QUANTITIES OF FOOD PRODUCTS FROM A RESERVOIR TO A RECEPTACLE

[76] Inventors: Frederick Ranson Trueman, 11, High St., Fareham; Roy George Swain Couzens, 3, Charlesworth Grdns., Waterlooville; Brian Henry Islip, 11, High St., Fareham, all of England

[22] Filed: Jan. 26, 1973

[21] Appl. No.: 327,103

[30] Foreign Application Priority Data
Jan. 26, 1972 United Kingdom........... 3740/72

[52] U.S. Cl. .................................... 222/254
[51] Int. Cl. .................................... G01f 11/06
[58] Field of Search .......... 222/252, 254, 284, 310, 222/283, 309, 255; 141/81, 249

[56] References Cited
UNITED STATES PATENTS

| | | | |
|---|---|---|---|
| 2,358,956 | 9/1944 | Ashbaugh | 222/252 X |
| 3,563,168 | 2/1971 | Doninger | 100/215 |
| 3,580,302 | 5/1971 | Riesenberg | 222/309 |
| 3,666,147 | 5/1972 | Shiraki et al. | 222/309 |

*Primary Examiner*—Stanley H. Tollberg
*Attorney, Agent, or Firm*—Birch and Birch

[57] ABSTRACT

A food dispenser suitable for use in a machine for packaging food products such as coleslaw. The dispenser includes an upstanding dispensing cylinder having an inlet in a side wall thereof and an outlet at the bottom. Connected to the inlet of the dispensing cylinder is the outlet of a horizontal filling cylinder whose inlet is connected to a storage tank. A filling piston is slidable in the filling cylinder and, in use, forces a predetermined quantity of food into the dispensing cylinder. For closing the outlet from the dispensing cylinder a closing cylinder is secured thereto with diametrically opposed apertures in its side wall aligned with the outlet of the dispensing cylinder. A closing piston, slidable with the closing cylinder, has an outlet aperture extending perpendicular to the axis thereof. Food is forced downwardly from the dispensing cylinder by a dispensing piston in that cylinder. A cut-off plate, slidable beneath the closing cylinder, is secured relative to the closing piston.

6 Claims, 4 Drawing Figures

MEANS FOR DISPENSING METERED QUANTITIES OF FOOD PRODUCTS FROM A RESERVOIR TO A RECEPTACLE

This invention relates to food dispensers.

The present invention consists in a dispenser for a food product which comprises a solid or a highly viscous liquid, the dispenser comprising a dispensing chamber having an inlet and an outlet for the said product, means for supplying the said product to the dispensing chamber via the inlet and for closing the inlet after a predetermined quantity of the said product has entered the chamber, a dispensing member slidably mounted within the dispensing chamber and adapted, upon movement towards the outlet, to force food product within the dispensing chamber outwardly via the outlet, and means for closing the outlet from the dispensing chamber after the said movement of the dispensing member is complete, thereby to prevent or substantially to prevent flow of excess food product from the outlet.

Preferably, a closing cylinder is disposed adjacent to the dispensing chamber with the axis thereof extending transversely of the direction of movement of the dispensing member within the dispensing chamber, the outlet from the dispensing chamber comprises a pair of aligned apertures formed at opposed sides, respectively, of the closing cylinder, and the means for closing the said outlet from the dispensing chamber comprise a closing piston which is slidably mounted within the closing cylinder and is formed with a bore which extends transversely of the axis of the closing piston, the closing piston being movable between an operative position, wherein the said bore is aligned with the aligned apertures in the closing cylinder, thereby to allow food product to flow from the dispensing chamber via the aligned apertures and the bore, and an inoperative position, wherein the piston closes the outlet.

Preferably, the closing means further comprise a cut-off plate which is secured relative to the closing piston for sliding movement therewith, the cut-off plate being moved across the path of food product emerging from the outlet from the dispensing chamber during movement of the closing piston towards the said inoperative position thereof, thereby to crop the said food product.

Suitably, the means for supplying the said product comprise a filling cylinder having an inlet for connection to a supply of the said product and an outlet connected to food inlet to the dispensing chamber, and a filling piston which is slidably mounted within the filling cylinder and is adapted, when moved towards the inlet to the dispensing chamber, to force the said predetermined quantity of the said product into the dispensing chamber and then to close the inlet to the dispensing chamber.

Suitably, the strokes of the dispensing piston and the filling piston are adjustable so that the said predetermined quantity of food can be varied.

Suitably, the dispenser is provided with a driving means and means coupling the driving means to the dispensing member, to the means for supplying food product to the dispensing chamber and closing the chamber, and to the means for closing the outlet from the dispensing chamber, whereby the dispensing member, supply means and closing means operate in a predetermined sequence and time relationship to effect filling of the dispensing chamber with the said product and then dispensing of the product from the chamber.

The invention will now be described, by way of example, with reference to the accompanying drawings, in which.

Figure 1:
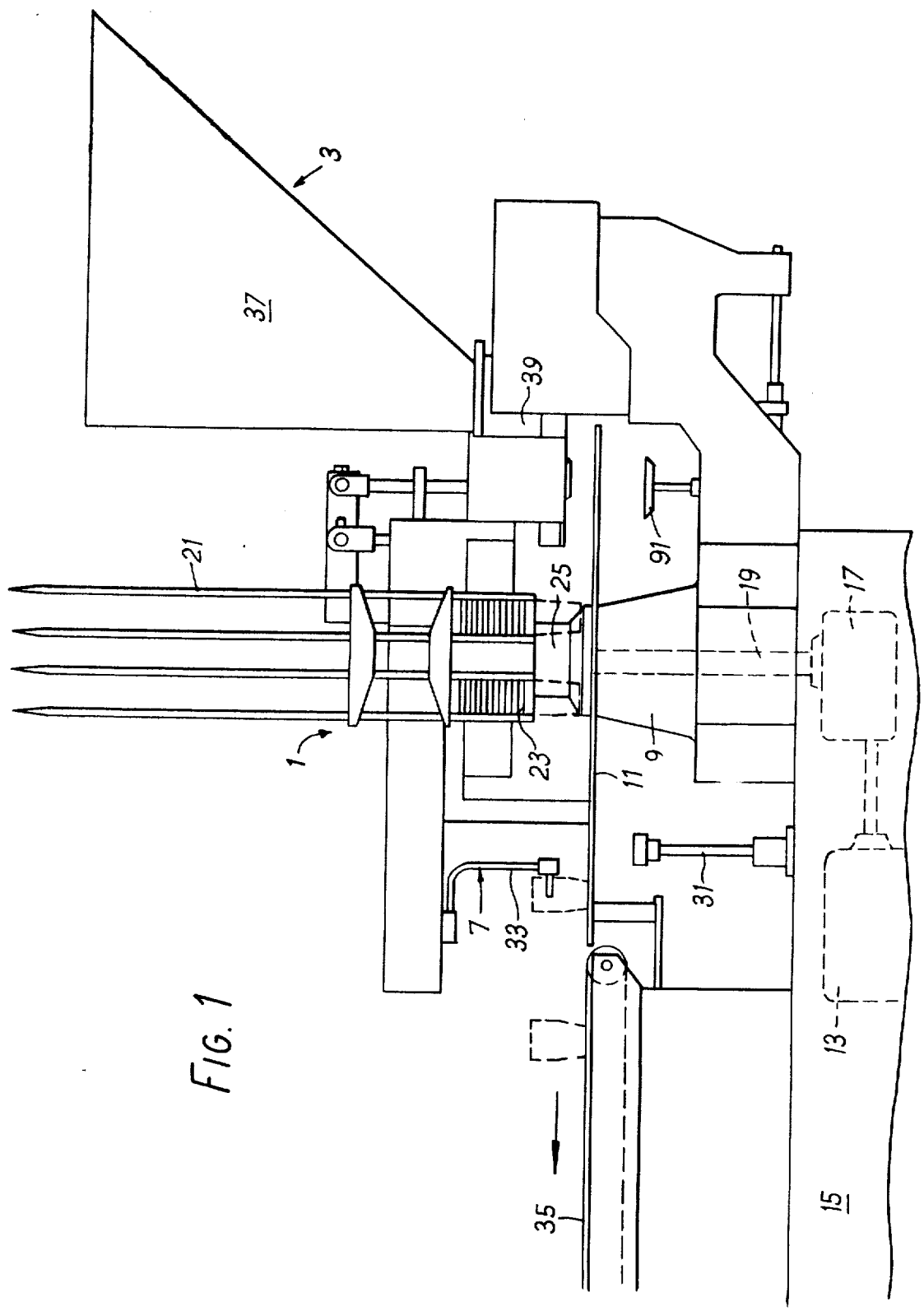
FIG. 1 is a side elevation of a machine for packaging food products which includes a dispenser according to the invention.

The machine shown in the drawings is a machine for packaging food products such as coleslaw, cottage cheese, Russian salad or the like product which comprises solid or highly viscous material. The product is packaged in thermoplastic containers, or cups, closed by snap-fit lids.

Figure 2:
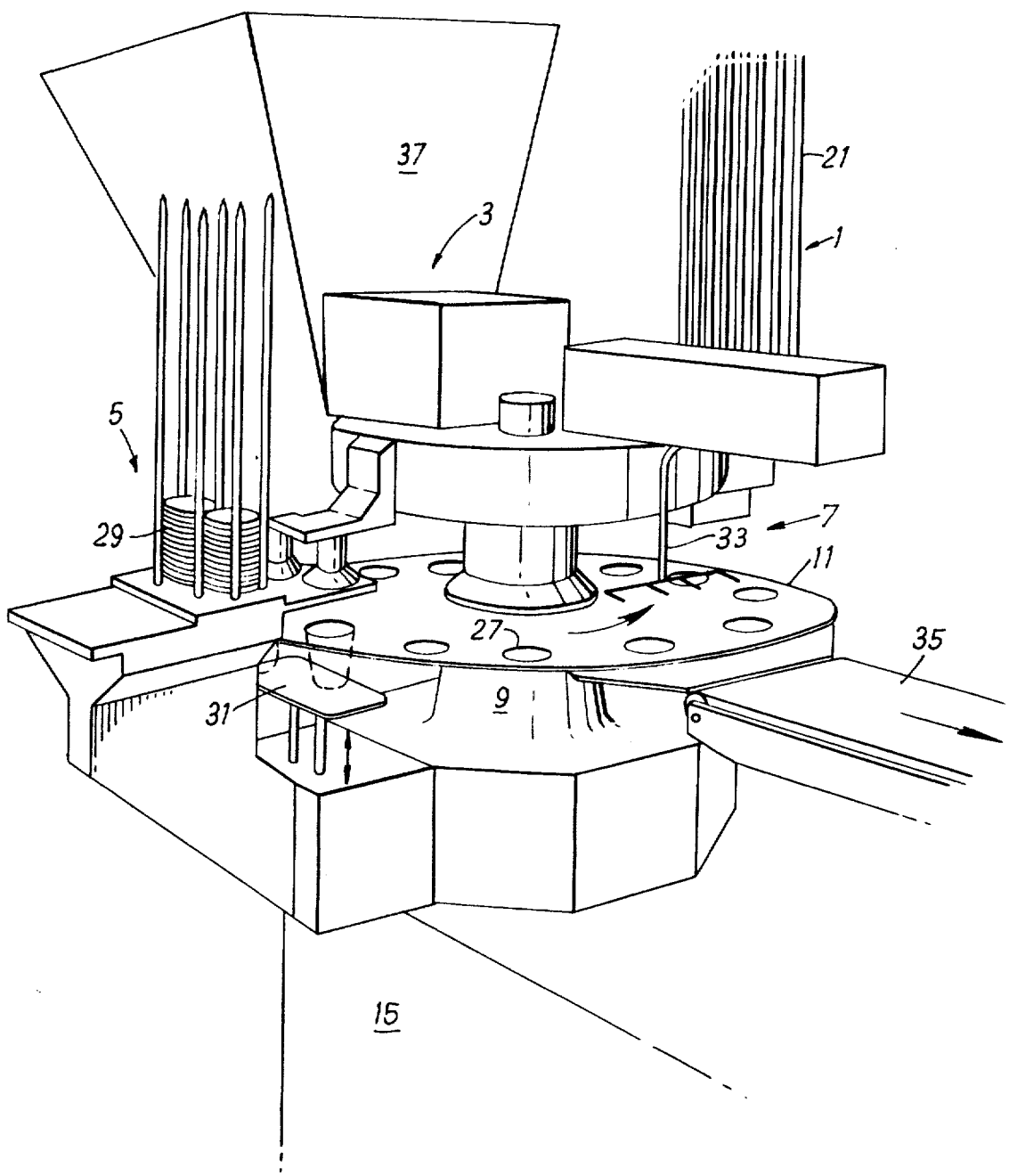
FIG. 2 is a perspective view from the front of the machine of FIG. 1.

Referring the FIGS. 1 and 2 the present machine includes a series of four operator stations, i.e. a cup storage and dispensing station 1, a filling station 3, a lidding station 5 and an ejector station 7, which are arranged around a central column 9 of the machine. A rotary table 11 serves to convey cups between the operator stations. Drive for the moving parts of each operator station 1, 3, 5 and 7 and for the rotary table 11 is derived from an electric motor 13 in a base part 15 of the machine, drive being transmitted to the stations via a gearbox 17, an upstanding driving shaft 19 in the central column 9 and one or more operator mechanisms at each station. The operator mechanisms are so designed that the moving parts of each operator mechanism are actuated in a predetermined sequence and time relationship. The rotary table 11 is coupled to the shaft 19 and is rotated intermittently so as to transfer cups from one station to the next in synchronism with the operation of the operator mechanisms.

The first of the four operator stations of the machine is the cup storage and dispensing station 1 where supports 21 are provided for storing two stacks 23 of thermoplastic cups. The stacks 23 are arranged side by side at angularly spaced locations about the central column 9 of the machine and associated with the stacks is a cup dispenser 25 for feeding the bottom cup in each stack into respective openings 27 in the rotary table 11. From the cup storage and dispensing station 1 each pair of cups is first conveyed to the filling station 3, hereinafter described, where a predetermined quantity of food product is supplied to the cups. Next, the cups travel to the lidding station 5 where two stacks 29 of lids are supported above the table 11 at angularly spaced locations respectively corresponding to those of the cups on the table. At the lidding station 5 a support 31 moves the two cups upwardly to meet the lowermost lids in respective stacks 29 and each lid is forced on to the associated cup in a manner which ensures a tight seal. From the lidding station 5 the cups are finally conveyed to the ejector station 7, where they are raised by an arm 33 and ejected from the rotary table 11 to an external conveyor belt 35 which conveys them to a packing table (not shown).

At the filling station 3 of the present machine there is a storage tank 37 which has a capacity of approximately eight gallons of a food product such as coleslaw, cottage cheese or Russian salad. Associated with the tank 37 is a dispenser 39 which is adapted to dispense the food product from the tank 37 in predetermined quantities of between 3 and 16 fluid ounces. As mentioned above, the moving parts of the filling station 3 are driven by operator mechanisms hereinafter described.

Figure 3:
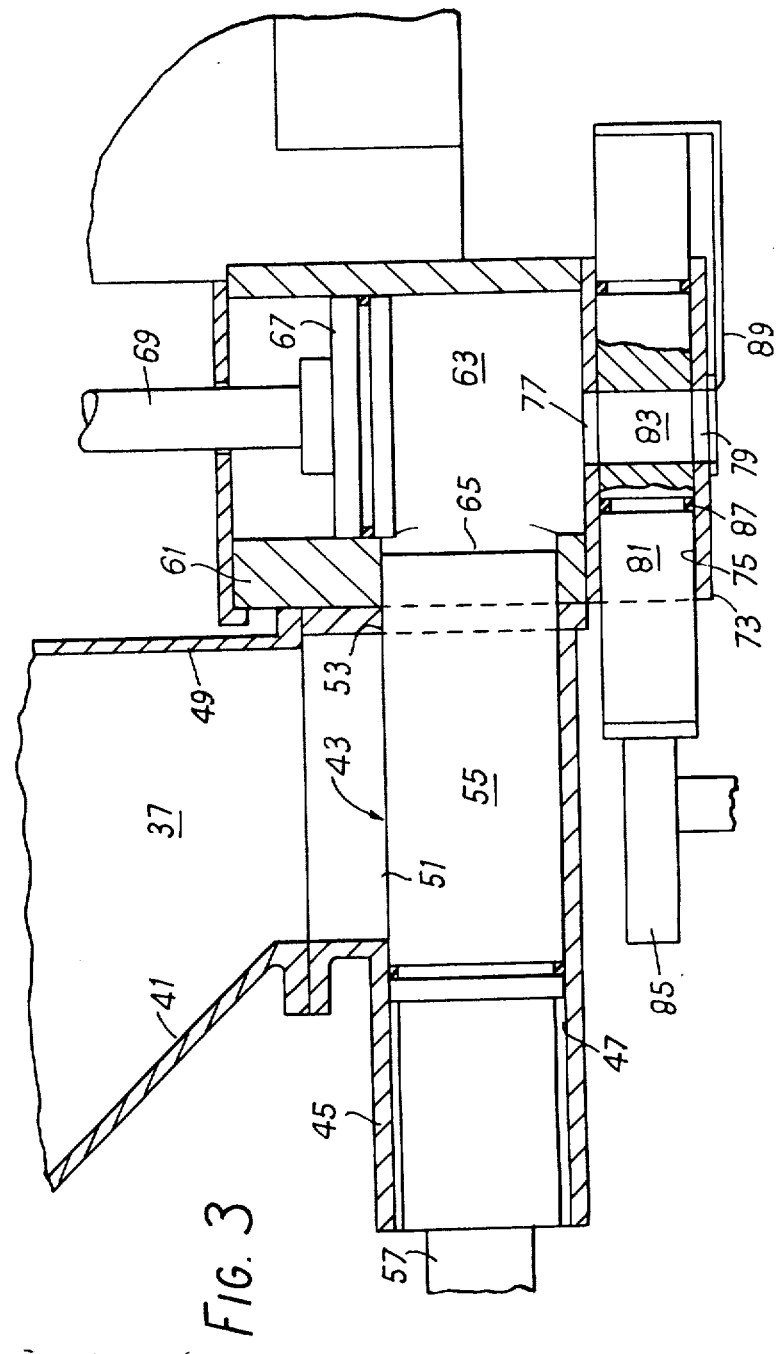
FIG. 3 is section of the dispenser in the machine of FIG. 1.
Figure 4:
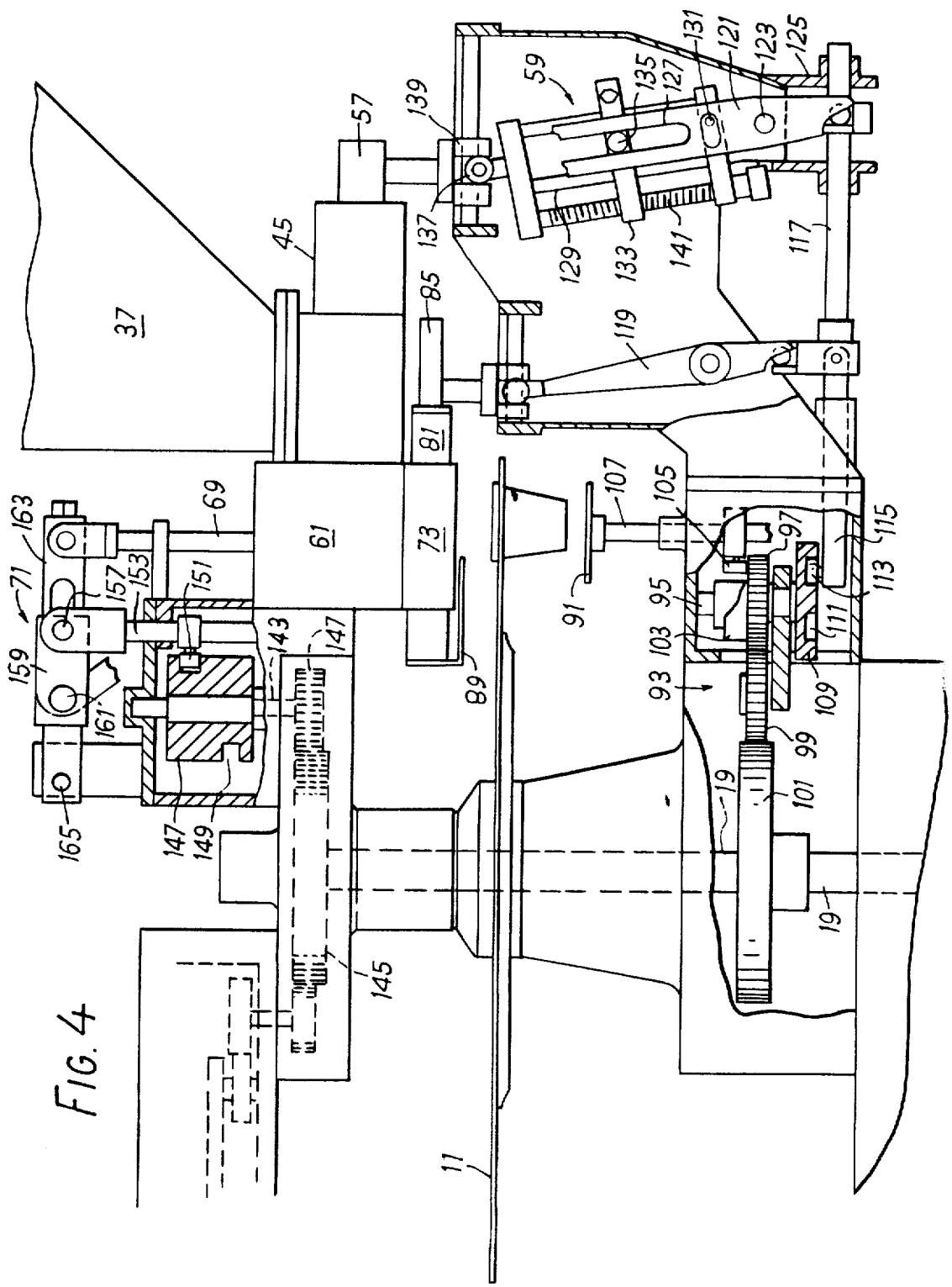
FIG. 4 is a part sectional side view of the machine of FIG. 1.

Referring to FIG. 3, the storage tank 37 has one side wall 41 which slopes inwardly and downwardly of the tank to assist in providing a flow of a food product downwardly towards a pair of outlets 43 in the bottom of the tank.

Below the storage tank 37 there is a block 45 formed with two filling cylinders 47 each of which is arranged with its axis horizontal and generally perpendicular to the inwardly and downwardly sloping side wall 41 and to an opposite, upstanding side wall 49 of the tank. Inlet openings 51 are formed in the block 45 to allow food product in the tank 37 to move downwardly into respective cylinders 47. Each cylinder 47 is open at one end to provide an outlet 53 for food product therein.

Slidably mounted within each filling cylinder 47 is an elongated filling piston 55 whose length is greater than the horizontal dimension of the food inlet 51 to the cylinder 47 from the storage tank 37. The filling piston 55 is connected to a piston rod 57 which extends outwardly from the end of the filling cylinder 47 remote from the food outlet 53. The piston rod 57 is coupled to a lower operator mechanism 59, as hereinafter described, and in use is reciprocated horizontally thereby. Reciprocation of the piston 57 is between a retracted postion, in which a leading end of the piston 55 is spaced from the food outlet 53 by a predetermined amount, and an advanced position, in which the leading end of the piston 55 has moved beyond and has closed the food outlet 53.

Secured to the block 45 is a further block 61 formed with two upstanding, cylindrical dispensing chambers 63. Adjacent to the filling cylinders 47 this further block 61 is formed with apertures which serve as inlets 65 to the dispensing chambers 63 from respective filling cylinders 47.

Slidable within each dispensing chamber 63 is a dispensing piston 67 which is coupled via a piston rod 69 to a further, top operator mechanism 71 of the filling station 3. As hereinafter described, the top operator mechanism 71 serves to reciprocate the dispensing pistons 67 upwardly and downwardly within respective dispensing chambers 63, when the machine is in use.

A third block 73 is secured below the block 61 and is formed with two closing cylinders 75. Each closing cylinder 75 has its axis horizontal and is disposed immediately beneath as associated dispensing chamber 63. To provide outlets from the dispensing chambers 63, apertures 77 are formed in an upper part of the third block 73, each aperture from a dispensing chamber to a side wall of the associated closing cylinder 75. Further apertures 79 are formed in a lower part of the block 73, each aperture 79 being vertically aligned with an associated upper aperture 77 and each extending from a side wall of a closing cylinder 75 to the lower face of the block 73.

Within each closing cylinder 75 there is an elongated closing piston 81 which is formed with a bore 83 extending perpendicular to the axis of the piston 81. Sliding movement of a closing piston 81 within a closing cylinder 75, as hereinafter described, moves the bore 83 between an operative postion, wherein it is vertically aligned with the associated apertures 77 and 79 to form an outlet from the associated dispensing chamber 63, and an inoperative position, wherein the bore 83 is offset from the apertures 77 and 79. Each closing piston 81 is secured to a piston rod 85 which is coupled to the lower operator mechanism 59 of the filling station 3. A sealing ring 87 is provided on each side of the nore 83 in each closing piston 81 so as to prevent food from escaping between the closing piston 81 and the closing cylinder 75.

Secured to the end of each closing piston 81 remote from its piston rod 85 is a cut-off plate 89 which extends horizontally below the associated closing cylinder 75 and has a cutting edge thereof vertically below the adjacent side of the bore 83 in the closing piston 81. When a closing piston 81 is moved from its inoperative position to its operative position the cutting edge of the cut-off plate 89 is moved horizontally below the third block 73, across the downwardly extending path of food product from the outlet of the associated dispensing chamber 63. This movement of a cut-off plate 89 serves to crop any food product extending downwardly from the bore 83 in the closing piston 81.

The dispensing chambers 63 and the closing cylinders 75 are arranged so that the cut-off plates 89 are a short distance above the rotary table 11. Each cup from the cup storage and dispensing station 1 is supported on the rotary table 11 with the body of the cup extending downwardly through one of the apertures 27 in the table 11 and a rim of the cup engaging an upper surface of the table. At the filling station 3 there is provided a cup support 91 which is arranged vertically below the cutlets from the dispensing chambers 63 and is reciprocable upwardly and downwardly by a lifting operator mechanism 93, hereinafter described. Movement of the cup support 91 to its uppermost position serves postion move the two cups upwardly relative to the table 11 to a location immediately below the cut-off plates 89 on the closing pistons 81. Downwards movement of the cup support 91 allows the cups to fall downwardly to their initial positions wherein the rim of each cup is engaged with the upper surface of the table 11.

As mentioned above, each of the operator mechanisms of the present machine including operator mechanisms 59, 71 and 93, is driven from the electric motor 13 in the base 15 of the machine via the gearbox 17 and shaft 19 in the central column 9.

At the filling station 3 the lifting operator mechanism 93, referred to above, provides the upwards and downwards reciprocating movement of the cup support 91. In this lifting operator mechanism 93 an upstanding stubshaft 95 has a gear 97 thereon coupled via an idler gear 99 to a further gear 101 on the upstanding driving shaft 19 in the central column 9. The stubshaft 95 is therefore rotated continuously when the electric motor 13 is energised and the driving shaft 19 is rotated.

Formed integrally with the gear 97 on the stubshaft 95 is an upper cam 103 and resting on the upper surface of this cam 103 is a roller 105 which is secured to a lower end of a lifting rod 107. At the upper end of the lifting rod 107 is the above-mentioned cup support 91. The upper surface of the cam 103 is profiled so that rotation of the stubshaft 95 causes reciprocation of the lifting rod 107, and hence of the cup support 91, in a vertical direction.

Secured to a lower end of the stubshaft 95 is a further cam 109 which has a shaped groove 111 formed in its lower surface. The groove in this lower cam 109 is engaged by a pin 113 on a horizontal output shaft 115 which is constrained for movement lengthwise thereof. Engagement between the pin 113 and groove 111 is such that rotation of the stubshaft 95 causes the output shaft 115 to reciprocate in a horizontal direction.

The output shaft 115 of the lifting operator mechanism 93 serves as an input to the lower operator mechanism 59 of the filling station 3.

At the input to the lower operator mechanism 59 there is an input shaft 117 which is coupled to the output shaft 115 of the lifting operator 93 and is likewise constrained for movement lengthwise thereof in a horizontal direction. Movement of this input shaft 117 is used to drive the filling pistons 55 and closing pistons 81, described above.

Thus, the input shaft 117 is first coupled to a lower end of an arm 119 which is pivoted at an intermediate location thereon and is coupled at its upper end to the piston rods 85 for the closing pistons 81. Reciprocation of the input shaft 117 in the manner described above causes pivotal movement of the arm 119 and reciprocation of the closing piston rods 85 and of the closing pistons 81 secured thereto.

At its end remote from the output shaft 115 of the lifting operator mechanism 93 the input shaft 117 of the lower operator 59 is coupled to the lower end of an upstanding forked member 121 which is pivoted on a pin 123 secured to a casing 125 of the operator mechanism 59 a short distance above its lower end. Above the pin 123 each arm of the forked member 121 is formed with an elongated slot 127 which extends lengthwise of the member 121.

Between the two arms of the forked member 121 there is a frame 129 which is pivoted on a pin 131 secured to the casing 125 of the operator mechanism 59. The frame 129 includes a cross member 133 which carries a roller 135 at each end thereof. Each roller 135 is engaged in an elongated slot 127 in one of the arms of the forked member 121. At the upper end of the frame 129 there are a pair of rollers 137 which engage a slide member 139 connected to the piston rods 57 of the filling pistons 55.

In operation, lengthwise movement of the input shaft 115 causes pivotal movement of the forked member 121, and engagement between the slots 127 in the forked member 121 and respective rollers 135 on the frame 129 causes the frame 129 to pivot about the pin 131 at its lower end. Pivotal movement of the frame 129 causes the slide member 139, and hence the filling piston rods 57 to move in a generally horizontal direction.

The magnitude of the movement of the slide member 139 can be varied by varying the vertical position of the cross member 133 relative to the elongated slots 127 in the forked member. This is effected by rotating a threaded rod 141 which is threadably engaged by the cross member 133.

At the input to the top operator mechanism 71 there is an upstanding stubshaft 143 which is driven from the driving shaft 19 in the central column 9 via a further gear 145 on the driving shaft 19 and a gear 147 at the lower end of the stub-shaft 143. The stub-shaft 143 carries a barrel cam 147 with a slot 149 which is engaged by a cam follower 151. The cam follower 151 is secured to a pair of upstanding rods 153 which are constrained to move in a vertical direction.

At their upper ends the rods 153 are connected together by a cross-member 155 which carries a pin 157 at one end thereof. The pin 157 is engaged in a groove formed in one side of an intermediate arm 159 pivoted about a horizontal axis 161.

On the other side of the intermediate arm 159 there is a further groove in which a pin secured to a main driving arm 163 is engaged. The main arm 163 is pivoted about a horizontal axis 165 at one end thereof and is coupled at its other end to the piston rods 69 of the dispending pistons 67.

When the barrel cam 147 in the top operator mechanism 71 is rotated the cam follower 151 and the upstanding rods 153 are reciprocated upwardly and downwardly. This causes the intermediate arm 159 to pivot about its horizontal axis and the pin and groove connection between the two arms 159 and 163 leads to a corresponding pivotal movement of the main driving arm 163. Pivotal movement of the main driving arm 163 causes the dispensing pistons 67 to be reciprocated upwardly and downwardly within the dispensing chambers 63. The magnitude of the pivotal movement of the main arm 163 can be adjusted by adjusting the location of the pin thereon lengthwise of the arm 163.

In use of the present machine, stacks 23 of cups are arranged in the supports 21 provided at the cup storage and dispensing station 1, the storage tank 37 at the filling station 3 is filled with the required food product, and stacks of lids are provided at the lidding station 5. The electric motor 13 in the base 15 of the machine is then energised so that drive is transmitted to the moving parts of the operator mechanisms at the various stations 1, 3, 5 and 7 and to the rotary table 11. Cups are therefore transferred from the bottom of each stack 23 at the storage and dispensing station 1 to the rotary table 11 and conveyed via the filling, lidding and ejecting stations 3, 5 and 7, respectively, to the external conveyor belt 35.

As one operating cycle at the filling station 3 is ending each dispensing piston 67 has reached its lowermost position in a dispensing chamber 63 and the filling pistons 55 are in their advanced positions wherein the leading end of each piston closes the inlet 65 to the associated dispensing chamber 63. Each closing piston 81 is in its operative position, wherein the bore 83 is aligned with the apertures 77 and 79 and food product is extending downwardly via the bore 83 and apertures 77 and 79 to a cup below.

At this stage the operator mechanisms 59, 71 and 93 at the filling station 3 operate to cause the various pistons to effect the following sequence of movements.

First, each closing piston 81 is moved across to its inoperative position wherein the piston closes the outlet from the associated dispensing chamber 63. As a result of this movement a quantity of food product is trapped in the bore 83 of the piston 81 and remains there within the closing cylinder 75. The movement is accompanied by movement of the associated cut-off plate 89 across the undersurface of the block 73, thereby to provide a sharp break between material trapped in the bore 83 of each closing piston 81 and material which is allowed to fall downwardly into the cups. Each cup is arranged with its central axis horizontally offset from the outlet of the associated dispensing chamber 63 so that the tendency of the closing piston 81 and the cut-off plate 89 to urge the food product sideways causes the product to move towards the central axis of the cup.

As the closing piston 81 and the cut-off plate 89 move towards their inoperative positions the filling piston 55 begins to move towards its retracted position. The movements are so arranged, however, that the leading end of the filling piston 55 has not moved through a sufficient distance to allow communication between the supply tank 37 and the dispensing chamber 63 until the outlet from the dispensing chamber has been closed by the closing piston 81. During these movements of the closing pistons 81 and the filling piston 55 the dispensing piston 67 begins to move upwardly within the dispensing chamber 63. The lifting rod 107 is reciprocated vertically by the lifting operator 93 so that the cups below the outlets from the dispensing chambers 63 are moved upwardly and then allowed to fall back into engagement with the rotary table 11, thereby to even the distribution of the food product within the cups.

At the end of this first part of a cycle each dispensing piston 67 is in its uppermost position, spaced from the outlet of the dispensing chamber 63 by the maximum amount. Each closing piston 81 is in its inoperative position wherein the outlet from the associated dispensing chamber 63 is closed. Each filling piston 55 is in its retracted position, wherein the leading end of the piston is spaced by a predetermined distance from the outlet 53 of the associated filling cylinder 47. The space between each filling piston 55 and the outlet 53 from the filling cylinder 47 has been filled with food product from the supply tank 37, downwards flow of product being caused partly by gravity and partly by a reduced pressure developed within the dispensing chamber 63 and the filling cylinder 47 during the upwards movement of the dispensing piston 67 and retraction of the filling piston 55.

In the next stage of the cycle the lower operator mechanism 59 moves each filling piston 55 from its retracted position, first to close the outlet 53 from the associated filling cylinder 47 and then to move the piston 55 into its advanced position wherein the leading end of the piston is generally co-planar with the inner surface of the side wall of the dispensing chamber 63. This movement of the filling piston 55 forces the predetermined quantity of food product within the filling cylinder 47 into the dispensing chamber 63.

Once the outlets 43 from the supply tank 37 are closed the lower operator mechanism 59 causes the closing pistons 81 to move towards their operative positions wherein the outlets from the dispensing chambers 63 are open. By the time the filling pistons 55 have come to rest the closing pistons 81 have reached their operative positions. The rotary table 11 has also been rotated to bring two fresh cups below respective outlets from the dispensing chambers 63.

The final part of the cycle is a downwards movement of the dispensing pistons 67 to force product within each dispensing chamber 63 downwardly via the associated aperture 77, bore 83 and aperture 79. Subsequently the closing pistons 81 are operated to close the outlets from the dispensing chambers 63 and the cut-off plates 89 crop material extending downwardly towards the cups in the manner described above.

The dispenser described above is suitable for dispensing coleslaw, cottage cheese, Russian salad or the like products which comprise solid or highly viscous material. Such products are drawn into the filling cylinders 47 by the influence of gravity and the reduced pressure in the dispensing chambers 63 and they are then forced into the dispensing chambers 63 by the filling pistons 55. With other products, such as margarine, which can be maintained in a less viscous state by appropriate choice of ambient conditions it is possible to avoid the need for filling pistons 55 and cylinders 47. Such products flow readily enough for them to be drawn into the dispensing chambers 63 under the influence of gravity and the reduced pressure in the chambers, 63.

The quantity of product dispensed can be varied by adjusting the stroke of the filling pistons 55 so as to vary the volume of the filling cylinders 47 into which the product can move down from the supply tank 37. This adjustment is made by adjusting the position of the cross-member 133 on the frame 129 in the lower operator 59, as described above. A corresponding adjustment is made in the stroke of the dispensing pistons 67, thereby to vary the effective volume of the dispensing chambers 63. This adjustment is made by moving the pin along the main driving arm 163 in the top operator 71, as also described above. As mentioned above, these adjustments can be used to vary the quantity of product dispensed between 3 and 16 fluid ounces. On the present machine, wherein two cups are filled at the same time, 120 to 160 cups can be filled per minute.

We claim:

1. A dispenser for a food product which comprises a solid or a highly viscous liquid, the dispenser comprising:

a dispensing chamber having an inlet and an outlet for the said product;

means for supplying the said product to said dispensing chamber via said inlet and for closing said inlet after a predetermined quantity of the said product has entered said chamber;

a dispensing member slidably mounted within said dispensing chamber and acting, upon movement towards said outlet, to force food product within said dispensing chamber outwardly via said outlet;

a closing cylinder disposed adjacent to said dispensing chamber with the axis thereof extending transversely of the direction of movement of said dispensing member within said dispensing chamber and including a pair of aligned apertures formed in opposite sides, respectively, of said closing cylinder comprising said outlet of said dispensing chamber; and means for closing said outlet from said dispensing chamber after the said movement of said dispensing member is complete, to substantially preclude flow of excess food product from said outlet, comprising:

a closing piston slidably mounted within said closing cylinder and formed with a bore which extends transversely of the axis of said closing piston, said closing piston being movable between an operative position, wherein the said bore is aligned with said aligned apertures in said closing cylinder, to allow food product to flow from said dispensing chamber via said aligned apertures and said bore, and an inoperative position, wherein said piston closes said outlet; and a cut-off plate secured relative to said closing piston for sliding movement therewith, said cut-off plate being moved across the path of food product emerging from said outlet from said dispensing chamber during movement of said closing piston towards the said inoperative position thereof, to crop the said food product emerging from said outlet.

2. A dispenser as claimed in claim 1, wherein said means for supplying the said product comprise a filling cylinder having an inlet for connection to a supply of the said product, an outlet connected to said inlet to said dispensing chamber and a filling piston, slidably mounted within the filling cylinder, acting, when moved towards said inlet to said dispensing chamber, to force the said predetermined quantity of the said product into said dispensing chamber and then to close said inlet to said dispensing chamber.

3. A dispenser as claimed in claim 2, wherein the said inlet to said filling cylinder is formed in a side wall of said filling cylinder and is extended in area, and said filling piston is elongated and is movable between a position wherein the said inlet to said filling cylinder is open and a position wherein one end of said filling piston closes said inlet to said dispensing chamber and a side face of said filling piston closes the said inlet to said filling cylinder.

4. A dispenser as claimed in claim 3, wherein the means for supplying the said product comprise a supply chamber having an outlet in a lower part thereof, and said filling cylinder is disposed with the said inlet thereto adjacent to the said outlet from said supply chamber to receive food product moving downwardly through the said outlet of said supply chamber.

5. A dispenser as claimed in claim 2 wherein the strokes of said dispensing member and said filling piston are adjustable to vary said predetermined quantity of food dispensed by said dispensing means.

6. A dispenser as claimed in claim 1, further comprising a driving means, and means coupling said driving means to said dispensing member, said means for supplying food product to said dispensing chamber and closing said inlet to said dispensing chamber, and said means for closing said outlet from said dispensing chamber, whereby said dispensing member, said supply means and said closing means operate in a predetermined sequence and time relationship to fill said dispensing chamber with the said product and dispense said product from said dispensing chamber.

* * * * *